(12) United States Patent
Hazan et al.

(10) Patent No.: US 8,494,994 B2
(45) Date of Patent: Jul. 23, 2013

(54) FAST ADAPTATION IN REAL-TIME SYSTEMS

(75) Inventors: Elad Eliezer Hazan, San Jose, CA (US); Nimrod Megiddo, Palo Alto, CA (US)

(73) Assignee: International Business Machines Corporation, Armonk, NY (US)

( * ) Notice: Subject to any disclaimer, the term of this patent is extended or adjusted under 35 U.S.C. 154(b) by 488 days.

(21) Appl. No.: 12/826,672

(22) Filed: Jun. 30, 2010

(65) Prior Publication Data

US 2012/0005142 A1    Jan. 5, 2012

(51) Int. Cl.
   *G06F 17/00* (2006.01)
(52) U.S. Cl.
   USPC .......................................................... 706/46
(58) Field of Classification Search
   None
   See application file for complete search history.

(56) References Cited

U.S. PATENT DOCUMENTS

| | | |
|---|---|---|
| 7,184,992 B1 | 2/2007 | Polyak et al. |
| 7,216,004 B2 | 5/2007 | Kohn et al. |
| 2005/0102044 A1 | 5/2005 | Kohn et al. |
| 2005/0257178 A1 | 11/2005 | Daems et al. |
| 2006/0112049 A1 | 5/2006 | Mehrotra et al. |
| 2008/0134193 A1 | 6/2008 | Corley et al. |
| 2008/0279434 A1 | 11/2008 | Cassill |
| 2008/0304516 A1 | 12/2008 | Feng et al. |
| 2008/0306891 A1 | 12/2008 | Hazan et al. |
| 2009/0280856 A1 | 11/2009 | Ohwatari et al. |

OTHER PUBLICATIONS

Flaxman et al., "Online convex optimization in the bandit setting: Gradient descent without a gradient," Symposium on Discrete Algorithms, Proceedings of the sixteenth annual ACM-SIAM symposium on Discrete algorithms, Vancouver, British Columbia, SESSION: Session 4C pp. 385-394, 2005, ISBN:0-89871-585.*
Hazan et al., "Logarithmic Regret Algorithms for Online Convex Optimization," Machine Learning Journal vol. 69, Issue 2-3 Paaes: 169-192 (Dec. 2007).*
Zhang et al., "Single and Multi-Period Optimal Inventory Control Models with Rish-Averse Constraints", European Journal of Operational Research 199, 2009, pp. 420-434.*
J. Abernethy, E. Hazan, and A. Rakhlin, *Competing in the Dark: An Efficient Algorithm for Bandit Linear Optimization*, Proceedings of the 21st Annual Conference on Learning Theory (COLT) (R. Servedio and T. Zhang, eds.), Springer, Berlin, 2008, http://www.eecs.berkeley.edu/Pubs/TechRpts/2008/EECS-2008-18.html, pp. 264-274.
N. Cesa-Bianchi and G. Lugosi, *Prediction, learning, and games*, Cambridge University Press, 2006.
T. Cover, *Universal portfolios*, Math. Finance 1 (1991), 1-19.

(Continued)

*Primary Examiner* — Jeffrey A Gaffin
*Assistant Examiner* — Paulinho E Smith
(74) *Attorney, Agent, or Firm* — Cantor Colburn LLP

(57) ABSTRACT

According to one embodiment of the present invention, a method for online convex optimization is provided. The method includes performing a step that relies on the selection of x at a time t ($x_t$), where x is a variable involved with the step. A resulting cost ($f_t(x_t)$) is calculated that results from selecting $x_t$ when performing the step, where $f_t$ is a cost function. A minimum possible cost ($f_t(x^*_t)$) associated with the selection of x* is then found and the difference between the resulting cost ($f_t(x_t)$) and the minimum possible cost ($f_t(x^*_t)$) is determined. A direction of movement from $x_t$ to $x_{t+1}$ is selected and a subsequent step that relies on the section of $x_{t+1}$ is then performed.

18 Claims, 2 Drawing Sheets

OTHER PUBLICATIONS

A .J. Grove, N. Littlestone, and D. Schuurmans, *General convergence results for linear discriminant updates,* Machine Learning 43 (2001), No. 3, 173-210.

E. Hazan, A. Kalai, S. Kale, and A. Agarwal, *Logarithmic Regret Algorithms for Online Convex Optimization,* Learning Theory: 19th Annual Conference on Learning Theory (COLT) (H. U. Simon and G. Lugosi, eds.), Springer, Berlin, 2006, http://www.springerlink.com/content/m1h022028472281v/, pp. 499-513.

A. T. Kalai and S. Vempala, *Efficient algorithms for online decision problems,* Journal of Computer and System Sciences 71(3) (2005), 291-307.

J. Kivinen and M. K. Warmuth, *Relative loss bounds for multidimensional regression problems,* Machine Learning 45 (2001), No. 3, 301-329.

N. Littlestone and M. K. Warmuth, *The weighted majority algorithm,* Proceedings of the 30th Annual Symposium on the Foundations of Computer Science, 1989, pp. 256-266.

A. Nemirovski, *Interior point polynomial time methods in convex programming,* Tech. Report 8813, Georgia Institute of Technology, 2004, http://www2.isye.gatech.edu/~ nemirovs/Lect IPM.pdf.

M. A. Zinkevich, *Online Convex Programming and Generalized Infinitesimal Gradient Ascent,* Proceedings of the 20th International Conference on Machine Learning (ICML) (T. Fawcett and N. Mishra, eds.), 2003, pp. 928-936.

Hazan et al., "Logarithmic Regret Algorithms for Online Convex Optimization," *Machine Learning Journal vol. 69* , Issue 2-3 pp. 169-192 (Dec. 2007).

Flaxman et al., "Online convex optimization in the bandit setting: Gradient descent without a gradient," Symposium on Discrete Algorithms, Proceedings of the sixteenth annual ACM-SIAM symposium on Discrete algorithms, Vancouver, British Columbia, SESSION: Session 4C pp. 385-394, 2005, ISBN:0-89871-585-7.

\* cited by examiner

FAST ADAPTATION IN REAL-TIME SYSTEMS

BACKGROUND

The present invention relates to optimization problems, and more specifically, to techniques for minimum regret learning in online convex optimization.

In real-time systems, the costs and other conditions are always changing. The operator of the system has to make decisions continually and the utility from making a decision depends not only on the decision itself but also on the conditions of the system or the environment. For example, the operator's task may be to track a "moving target" in the sense that the target may jump from one point to another and the operator has to aim without knowing exactly where the target is, but only where it previously was. This happens, for example, in inventory systems, where there is an optimal level of inventory in hindsight, but the decision about the inventory level has to be made before the actual demand for the item is known. The "regret" of the operator is the difference between the cost that is incurred as a result of his decision and the optimal cost that could have been incurred using another decision if the conditions had been known. In the prior art, methods have been known which minimize the total regret so that it is proportional to the square root of the total amount of time.

SUMMARY

According to one embodiment of the present invention, a method comprises: performing a step that relies on the selection of x at a time t ($x_t$), where x is a variable involved with the step; calculating a resulting cost ($f_t(x_t)$) that results from selecting $x_t$ when performing the step, where $f_t$ is a cost function; finding a minimum possible cost ($f_t(x^*_t)$) associated with the selection of x*; determining the difference between the resulting cost ($f_t(x_t)$) and the minimum possible cost ($f_t(x^*_t)$); selecting a direction of movement from $x_t$ to $x_{t+1}$; and performing a subsequent step that relies on the section of $x_{t+1}$.

According to another embodiment of the present invention, a system is provided for iteratively improving a chosen solution to an online convex optimization problem. The system executing procedures for: selecting x at a time t ($x_t$), where x is a quantity; calculating a resulting cost ($f_t(x_t)$) that results from selecting $x_t$ when performing the step, where $f_t$ is a cost function; finding a minimum possible cost ($f_t(x^*_t)$) associated with the selection of x*; determining the difference between the resulting cost ($f_t(x_t)$) and the minimum possible cost ($f_t(x^*_t)$); selecting a direction of movement from $x_t$ to $x_{t+1}$.

According to another embodiment of the present invention, a computer program product for online convex optimization comprises: a computer usable medium having computer usable program code embodied therewith, the computer usable program code comprising: computer usable program code configured to: perform a step that relies on the selection of x at a time t ($x_t$), where x is a variable involved with the step; calculate a resulting cost ($f_t(x_t)$) that results from selecting $x_t$ when performing the step, where $f_t$ is a cost function; finding a minimum possible cost ($f_t(x^*_t)$) associated with the selection of x*; determining the difference between the resulting cost ($f_t(x_t)$) and the minimum possible cost ($f_t(x^*_t)$); selecting a direction of movement from $x_t$ to $x_{t+1}$; and performing a subsequent step that relies on the section of $x_{t+1}$.

DETAILED DESCRIPTION

Figure 1:
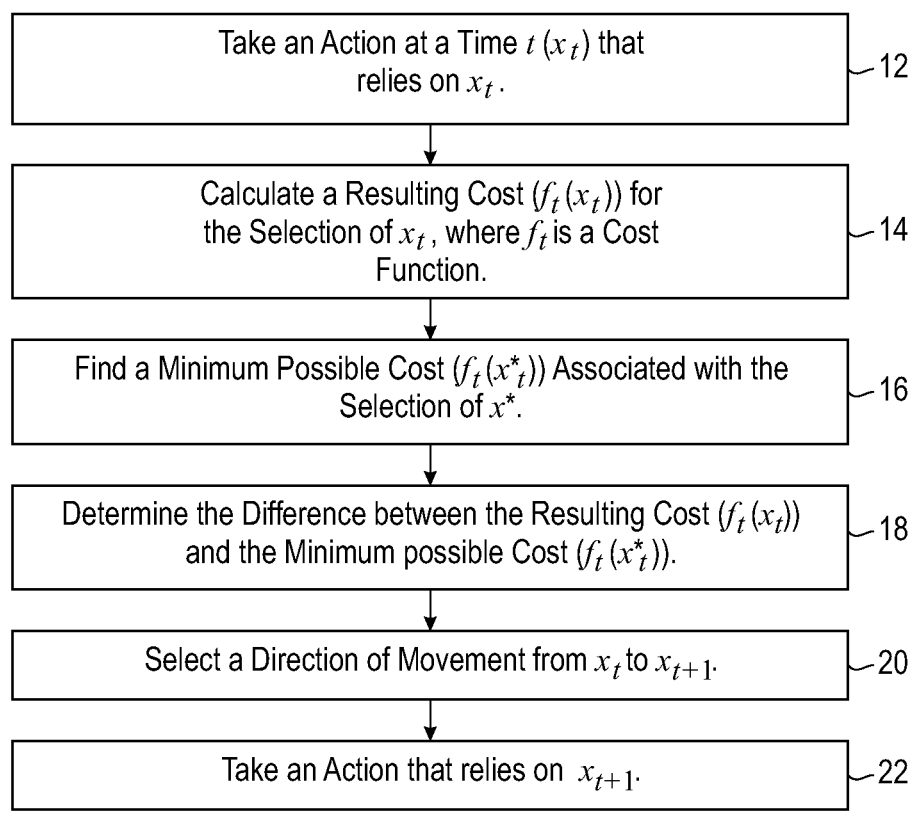
FIG. 1 shows a diagram of a flow-chart for performing online convex optimization in accordance with an embodiment of the invention.

Embodiments of the invention provide ways to improve the speed of computing online convex optimization problems.

As described above, prior art methods of computing total regret exist so that it is proportional to the square root of the total amount of time. However, these methods required elaborate computation before each decision. More precisely, they required the solution of an optimization problem. In some real-time systems such a computational task is not practical. Hence, there is a need for much faster computational methods. Also, prior-art methods that were relatively fast were limited to a linear cost function and were not "adaptive."

In embodiments of the invention, the above-discussed problem is formulated so that at time t the operator picks a point $x_t$ without knowing the current cost function $f$. The resulting cost is $f_t(x_t)$. The regret after T time stages is equal to the difference between the sum of the incurred costs $f_1(x_1) + \ldots + f_T(x_T)$ and the minimum possible cost with some fixed decision x*, i.e., the sum $f_1(x^*) + \ldots + f_T(x^*)$. The domain K in n-dimensional space, from which the operator picks $x_t$ is given by a "barrier function" β. Embodiments of the invention choose the direction of movement from $x_t$ to $x_{t+1}$. In particular, these embodiments pick this direction as product of the inverse Hessian of the barrier function beta times the gradient of $f_t$. This yields an algorithm that in each step requires only solving a set of linear equations in dimension n rather an optimization problem over K. The resulting regret is proportional to the square root of T log T, so it is almost optimal.

In particular, embodiments of the invention utilize a new method for regret minimization in online convex optimization. The regret of the algorithm after T time periods is almost the minimum possible. However, in n-dimensional space, during each iteration, the embodiments of the invention essentially solves a system of linear equations of order n, whereas previous techniques had to solve some constrained convex optimization problem in n dimensions and possibly many constraints. Thus, the embodiments of the invention improve running time by a factor of at least the square root of n, and much more for nontrivial domains. These embodiments are also adaptive, in the sense that the regret bounds hold not only for the time periods 1, ..., T, but also for every sub-interval s, s+1, ..., t.

Online Convex Optimization

In the Online Convex Optimization problem an adversary picks a sequence of convex functions $f_t: K \to \mathbb{R}$ t=1, 2, ..., T, where $K \subset \mathbb{R}^n$ is convex and compact. At stage t, the player has to pick an $x_t \in K$ without knowing the function $f_t$. The player then incurs a cost of $f_t(x_t)$. The setting of this disclosure is that after choosing $x_t$, the player is informed of the entire function $f_t$ over K. The total cost to the player is $\Sigma_{t=1}^{T} f_t(x_t)$. Online Convex Optimization encompasses, for example, expert algorithms with arbitrary convex loss function and the problem of universal portfolio optimization.

Regret Minimization

Suppose the minimum cost over all possible single choices is attained at some $x^* = \text{argmin}_{x \in K} \Sigma_{t=1}^T f_t(x)$. In this case the regret resulting from the choices $(x_1; f_1, \ldots, x_T; f_T)$ is defined as $$R = R(x_1; f_1, \ldots, x_T; f_T) \equiv \Sigma_{t=1}^T [f_t(x_t) - f_t(x_t) - f_t(x^*)]$$

The problem of regret minimization calls for choosing the points $x_1, \ldots, x_T$ so as to minimize R, subject to the condition that, when $x_{t+1}$ is chosen, only $x_1, f_1, \ldots, x_t, f_t$ are known. It is known that, in the worst case, the minimum possible regret is $\Omega(\sqrt{T})$.

Computational Efficiency

In all the previously known algorithms that attain minimum possible regret, in each stage the algorithm must solve some constrained convex optimization problem over K, which can be prohibitive in some practical applications. In particular, if K is a convex polyhedron, the best known worst-case bound on the number of iterations of an optimization algorithm is $O(\sqrt{n}L)$, where L is the number of bits in the description of K, and each iteration requires solving a linear system of order n. Motivated by this shortcoming of the previous algorithms, embodiments of the present invention utilize a new method for constructing an almost-minimum-regret algorithm, which requires in each stage only solving a system of linear equations of order n, rather than solving an optimization problem over K. Thus, embodiments of the invention improve the running time at least by a factor n, and much more than that when K is more complicated, for example, a convex polyhedron with many facets. In addition, embodiments of the invention are "adaptive" in the sense that its regret is the almost the minimum possible not only over the stages 1, ..., T but also over every sub-interval of stages s, s+1, ..., t.

Previous Approaches

There are numerous algorithms for Online Convex Optimization, some of which attain the minimum possible regret of $O(\sqrt{T})$ Most of these algorithms can be classified into the following two classes: (i) link-function algorithms, and (ii) regularized follow-the-leader algorithms.

Follow-the-Regularized-Leader Algorithms

The intuitive "Follow-The-Leader" (FTL) algorithm picks for $x_{t+1}$ a minimizer of the function $F_t(x) \equiv \Sigma_{s=1}^t f_s(x)$ over K. It is known that the regret of FTL is not optimal. This fact suggested the more general "Follow-The-Regularized-Leader" (FTRL) algorithm that picks $x_{t+1}$ as a minimizer of the function $F_t(x) + \rho(x)$ over K, where $\rho(x)$ is a certain function that serves as a "regularizer". Different variants of the method correspond to different choices of $\rho(x)$. The FTRL approach led to the resolution of some prediction problems, notably the resolution of the value of bandit information in. One advantage of the FTRL approach is its relatively intuitive analysis. On the negative side, FTRL algorithms are known to be "non-adaptive", in the sense that the regret over a general sub-interval s, s+1, ..., t may be linear in t−s rather than $O(\sqrt{t-s})$ Furthermore, the running time of the algorithm in each stage may not be practical because the algorithm has to solve some optimization problem over K.

The "Link Function" Methodology

In contrast to the intuitive FTRL methodology, which relies on the entire past of history of the play, link-function algorithms use less information and proceed "incrementally." Perhaps the easiest algorithm to describe is Linkevich's online gradient descent, which picks $x_{t+1}$ to be the orthogonal projection of the point $y_{t+1} \equiv x_t + \eta \nabla f_t(x_t)$ into K. Of course, $x_{t+1}$ is the point in K nearest $y_{t+1}$, hence its computation can be costly, for example, if K has many facets. On the other hand, link-function algorithms are adaptive (in the sense explained above) and are usually more efficiently computable than FTRL algorithms in case projections turn out to be easy. However, link-function algorithms tend to be harder to analyze.

Merging the Two Approaches

An important aspect of the embodiments of the invention is to follow the incremental-update approach, but make sure it never requires projections from the exterior of K into K (hence the name "interior point"). This is accomplished by moving from $x_t$ to $x_{t+1}$ in a direction that is obtained from the gradient of $\nabla f_t(x_t)$ by a linear transformation (like in Newton's method), which depends on K and $x_t$. The assumption is that K is specified by means of a self-concordant barrier function (see below). This particular concept was introduced to learning theory, which used these barriers as regularizers. Embodiments of the invention can be interpreted as using the barrier function as a link function rather than a regularizes.

Embodiments of the invention teach the design and analysis of a new method for online convex optimization. The regret of the algorithm is almost the minimum possible. It is adaptive and requires only to solve one system of linear equations of order n per stage. In comparison to previous work, prior minimum-regret algorithms require, in the worst case, to solve a complete optimization problem each iteration. Also, they are generally not adaptive, they works only on linear cost functions rather than the general setting, and they require the computation of the so-called analytic center of K for the starting point $x_1$, which requires to solving a nontrivial optimization problem.

Preliminaries—Self-Concordant Barrier

We assume that K is given by means of a barrier function β: int K → ℝ, i.e., for every sequence $\{x^k\}_{k=1}^\infty$ int K that converges to the boundary of K, the sequence tends to infinity. We further assume that for some $\vartheta > 0$, $\beta(x)$ is a $\vartheta$ self-concordant barrier, i.e., it is thrice differentiable and for every x∈int K and every h∈ℝ$^n$, the function $\tilde{f}(t) \equiv \beta(x+th)$ satisfies (i) $|\tilde{f}'''(0)| \leq 2[\tilde{f}''(0)]^{3/2}$ (i.e., f is a self-concordant function), and also (ii) $[\tilde{f}'(0)]^2 \leq \vartheta \cdot \tilde{f}''(0)$. It follows that $\beta(x)$ is strictly convex. For example, for A∈ℝ$^{m \times n}$ and b∈ℝ$^m$, the function $\beta(x) = -\Sigma_{i=1}^m \ln[(Ax)_i - b_i]$, (defined for x such that Ax>b is an m-self-concordant barrier for a polyhedron $\{x \in \mathbb{R}^n | Ax+b\}$.

The Dikin Ellipsoid

For every v∈ℝ$^n$ and A∈ℝ$^{n \times n}$, denote $\|v\|_A \equiv \sqrt{v^T A v}$. For every h∈ℝ$^n$, denote $\|h\|_x \equiv \sqrt{h^T [\nabla^2 \beta(x)] h}$. The open Dikin ellipsoid of radius r centered at x, denoted by $W_r(x)$, is the set of all y=x+h∈K such that $\|h\|_x^2 = h^T [\nabla^2 \beta(x)] h < r^2$.

Below we use the following known facts about the Dikin ellipsoid and self-concordant functions:

Proposition 1. For every x∈K, $W_1(x) \cup$ int K.

The next proposition provides "bounds" on the Hessian $\nabla^2 \beta(x+h)$ of $\beta(x+h)$ within Dikin's ellipsoid. For A, B∈ℝ$^{m \times n}$, the notation A ≺ B means that A−B is positive semi-definite.

Proposition 2. For every h such that $\|h\|_x < 1$, $$(1-\|h\|_x)^2 \nabla^2 \beta(x) \prec \nabla^2 \beta(x+h) \prec (1-\|h\|_x)^{-2} \nabla^2 \beta(x) \quad (1)$$

We denote the diameter of K by Δ.

Proposition 3. If (i) $\beta(x)$ is a barrier function for K, and (ii) $\beta(x)$ is self-concordant, then for every x∈int K all the eigenvalues of $\nabla^2 \beta(x)$ are greater than or equal to $$\frac{1}{\Delta^2}.$$

Corollary 4. For every x∈int K, all the eigenvalues of $[\nabla^2 \beta(x)]^{-1}$ are less than or equal to $\Delta^2$.

Method of the Embodiments and Regret Bounds

We assume in this section that when the player has to pick the next point $x_{t+1}$, the player recalls $x_t$ and knows $\nabla f_t(x_t)$ and $\nabla^2 \beta(x_t)$. Interior-point algorithms for optimization typically utilize the Newton direction, which in the case of minimizing a function of the form $F_\mu(x) \equiv f(x) - \mu \cdot \beta(x)$, while at a point x, would be $n = -[\nabla^2 F_\mu(x)]^{-1} \nabla(F_\mu)(x)$. However, for minimum regret online optimization, it turns out that the following direction is useful:

$$n_t = -[\nabla^2 \beta(x_t)]^{-1} \nabla(f_t)(x_t)$$

i.e., the gradient factor is determined by the previous objective function $f_t$, while the Hessian factor is determined by the barrier function $\beta$. Thus, when the method of the invention is used, the player picks $x_{t+1} = x_t + \eta \, n_t$ where $0 < \eta < 1$ is a scalar whose value depends on T; it tends to zero as T tends to infinity. Denote $g_t = \nabla(f_t)(x_t)$ and $H_t = \nabla^2 \beta(x_t)$. Thus, $n_t = -H_t^{-1} g_t$.

Validity. It can be proven that the algorithm generates only points in K.

Proposition 5. For every t, if $x_t \in \text{int } K$ and $\eta < (g_t^T H_t^{-1} g_t)^{-1/2}$, then $x_{t+1} \in \text{int } K$.

By corollary 4, $$g_t^T H_t^{-1} g_t \leq \nabla^2 \cdot \|g_t\|^2 \qquad (2)$$

Thus, we also have

Corollary 6. If $$n < \frac{1}{\Delta \cdot \|g_t\|},$$

then $x_{t+1} \in \text{int } K$.

A Bound on the Gradients

We wish to express our bound on the regret with respect to bounds on the gradients of the functions selected by the adversary. Thus, we denote $$G = \max\{\|\nabla f t(x)\| : x \in K, t = 1, \ldots, T\}$$

Since the player does not know the function $f_t$ at the time of picking $x_t$, and that choice depends on G, we simply assume that the adversary is restricted to choosing only functions $f$ such that $\|\nabla f t(x)\| \leq G$ for every $x \in K$. We note that standard techniques can be used, without harming our asymptotic regret bounds, to eliminate the requirement that the algorithm knows an upper bound G a priori.

Proposition 7. For every t, t = 1, ..., T, $$\eta g_t^T (x_t - x^*) \leq [\nabla \beta(x_{t+1}) - \nabla \beta(x_t)]^T (x_t - x^*) + G\Delta \cdot (3G^2 + 4G\Delta + 3\Delta^2) \cdot \eta_2. \qquad (3)$$

A Bound Dependent on Bregman Divergence

Bregman divergence. Let $x_1, \ldots, x_T$ denote the sequence that is generated by the algorithm of this section. Recall that for x, $y \in \text{int } K$, the Bregman divergence $B_\beta(x, y)$ with respect to the barrier $\beta(x)$ is $$B_\beta(x,y) = \beta(x) - \beta(y) - [\nabla \beta(y)]^T (x - y).$$

Regret. Given the functions $f_1, \ldots, f_T$ and the choices $x_1, \ldots, x_T$ for any $x^* \in K$, the regret with respect to $x^*$ is defined by $$R(x^*) = \Sigma_{t=1}^T f_t(x_t) - \Sigma_{t=1}^T (x^*).$$

Denote $$C(G, \Delta) = \sqrt{3G\Delta} \cdot (G + \Delta).$$

Theorem 1. For every $x^* \in K$, $$R(x^*) \leq 2C(G, \Delta) \sqrt{B_\beta(x^*, x_1)} \cdot \sqrt{T}.$$

Note that as $x^*$ tends to the boundary of K, $B_\beta(x^*, x_1)$ tends to infinity, and hence necessarily so does D. Thus, the regret bound for $x^*$ on the boundary of K requires further analysis. This is what we describe below.

The Final Regret Bound

Proposition 8. Let $\beta(\cdot)$ be a $\vartheta$-self-concordant barrier for K, and let $x \in \text{int } K$ and unit vector $u \in \mathbb{R}^n$ be such that $u^T \nabla \beta(x) > 0$. Let $t_{max} = t_{max}(x, u)$ be defined as $$t_{max} = t_{max}(x, u) \max\{t \mid x + tu \in K\} \leq \Delta$$

Under these conditions, $$u^T \nabla \beta(x) \leq \frac{\vartheta}{t_{max}(x, u)}.$$

For distinct vectors $x, y \in K$, denote $$\tau_{max}(x, y) = t_{max}\left(x, \frac{y - x}{\|y - x\|}\right).$$

Proposition 9. If x, $y \in \text{int } K$ are distinct, then $$\beta(y) - \beta(x) \leq -\ln\left(1 - \frac{\|y - x\|}{\tau_{max}(x, y)}\right) \cdot \vartheta.$$

Definition 1. Given the initial point $x_1 \in \text{int } K$ and a real $\delta > 0$, the inner subset $K(\delta; x_1)$ is defined by $$K(\delta; x_1) = \left\{ y \in K : \|y - x_1\| \leq \frac{1}{1 + \delta} \cdot \tau_{max}(x_1, y) \right\}.$$

Corollary 10. If $y \in K(\delta; x_1)$, then $\beta(y) - \beta(x_1) \leq \ln(1 + 1/\delta) \cdot \vartheta$.

Proposition 11. There exists a constant c such that for every $x^* \in K$, $$R(x^*) \leq c \cdot \vartheta \sqrt{G\Delta} \cdot (G + \Delta) \sqrt{T \log T}.$$

The bound of the latter proposition can be improved by a suitable of choice of units as follows.

Theorem 2. There exists a constant c such that such that for every $x^* \in K$, $$R(x^*) \leq c \sqrt{\vartheta} \cdot G\Delta \sqrt{T \log T}.$$

Generalized News Vendor Problem

In one embodiment of the invention, the above-described methods are applied to the news vendor problem (NVP), which is a classic problem in operations research. In the NVP a seller of newspapers has to order a certain number of copies of the next day's newspaper without knowing exactly how many copies he could sell. The paper becomes worthless if not sold. If the vendor orders too many copies, he loses on the unsold copies. If he orders too few copies, he loses the opportunity to sell more. In the prior art, the problem is solved under an assumed probability distribution of the next day's demand. In this embodiment of the invention a generalization of this problem is employed without any assumptions on the distribution of the demands.

In the present embodiment the NVP may be applied to a situation involving an arbitrary number of perishable commodities. The vendor has to determine at each time t (t=1, 2, ...) the order quantities $x_t^i$ of commodities i=1, ..., n. The (nonrefundable) total cost of the orders is $c^1 x_t^1 + \ldots + c^n x_t^n$. If the vendor later sells the quantities $s_t^1, \ldots, s_t^n$, respectively, then he realizes a revenue of $r^1 s_t^1 + \ldots + r^n s_t^n$. However, the vendor does not know the amounts $s_t^1, \ldots, s_t^n$ in advance, except that, necessarily, $$0 \leq s_t^i \leq x_t^i (i=1, \ldots, n)$$

The vendor has to make these decisions every time period at the end of the period, after having observed the demands $d_t^1, \ldots, d_t^n$ for the respective commodities during that period.

The amounts $x_t^1, \ldots, x_t^n$ must also satisfy some constraints. First, $x_t^i \geq 0$ (i=1, ..., n). Second, there is a budget constraint $$b^1 x_t^1 + \ldots + b^n x_t^n \leq B$$

Finally, there are also availability constraints $x_t^i \leq a^i$ (i=1, ..., n).

Loss Functions

We denote $x=(x^1, \ldots, x^n)$. Given actual demands $d_t^1, \ldots, d_t^n$, if the orders are X, then the cost to the vendor is equal to $$f_t(x) = \sum_i c^i x^i - \sum_i r^i \min\{x^i, d_t^i\}.$$

If $x^i \neq d_t^i$, then $$\frac{\partial f_t(x)}{\partial x^i} = \begin{cases} c_i - r_i & \text{if } x^i < d_t^i \\ c_i & \text{if } x^i > d_t^i \end{cases} \quad (3)$$

If $x^i = d_t^i$, we define $$\frac{\partial f_t(x)}{\partial x^i} = c_i - r_i.$$

Denote $g_t = (g_t^1, \ldots, g_t^n)$ where $$g_t^i = \frac{\partial f_t(x)}{\partial x^i}.$$

Constraints. The domain of decisions is the set P of all $x=(x^1, \ldots, x^n)$ in n space such that $$\sum_i b^i x^i \leq B$$

$$0 \leq x^i \leq a^i (i=1, \ldots, n).$$

We define the following "barrier function"

$$\beta(x) = -\log(B - \Sigma_i b^i x^i) - \Sigma_i \log x^i - \Sigma_i \log(a^i - x^i)$$

for all x that satisfies all the constraints strictly, i.e., $$\Sigma_i b^i x^i < B$$

$$0 < x_i < a_i (i=1, \ldots, n).$$

We have $$\frac{\partial \beta(x_t)}{\partial x^i} = \frac{b^i}{B - \sum_j b^j x_t^j} - \frac{1}{x_t^i} + \frac{1}{a^i - x_t^i}, \quad (4)$$

$$\frac{\partial^2 \beta(x_t)}{(\partial x^i)^2} = \frac{(b^i)^2}{\left(B - \sum_j b^j x_t^j\right)^2} + \frac{1}{(x_t^i)^2} + \frac{1}{(a^i - x_t^i)^2},$$

and for k≠i, $$\frac{\partial^2 \beta(x_t)}{\partial x^k \partial x^i} = \frac{b^k b^i}{\left(B - \sum_j b^j x_t^j\right)^2}. \quad (5)$$

Denote by $$H_t = ((H_t)_{ik})$$

the Hessian matrix, where $$(H_t)_{ik} = \frac{\partial^2 \beta(x_t)}{\partial x^k \partial x^i} \quad (6)$$

In an embodiment of the invention, a constant $\eta$ is used such that $0 < \eta < 1$.

1. At time t, when it is time to choose the vector $x_{t+1}$, first calculate the entries of the matrix $H_t$ according to equations 4-6 above and the vector $g_t$, the gradient of $f_t$, as defined in equation 3 above.

2. Let $n_t$ be the solution of the following systems of linear equations:

$$H_t n_t = -g_t.$$

3. The choice of $x_{t+1}$ is $$x_{t+1} = x_t + \eta n_t.$$

Referring now to FIG. 1 there is shown a flowchart of an online convex optimization method in accordance with an embodiment of the invention. The method 10 includes step 12 which includes taking action at a time t ($x_t$) that relies on $x_t$. In step 14, a resulting cost ($f_t(x_t)$) is calculated for the selection of $x_t$, where $f_t$ is a cost function. The process then finds a minimum possible cost ($f_t(x^*_t)$) associated with the selection of $x^*$, in step 16. In step 18 the difference between the resulting cost ($f_t(x_t)$) and the minimum possible cost ($f_t(x^*_t)$) is determined. A direction of movement is selected from $x_t$ to $x_{t+1}$, in step 20. In step 22, an action that relies on $x_{t+1}$ is taken.

As can be seen from the above disclosure, embodiments of the invention provide techniques for online convex optimization. As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction running system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction running system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may run entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which run via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which run on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more instructions for implementing the specified logical function(s). It should also be noted that, in some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
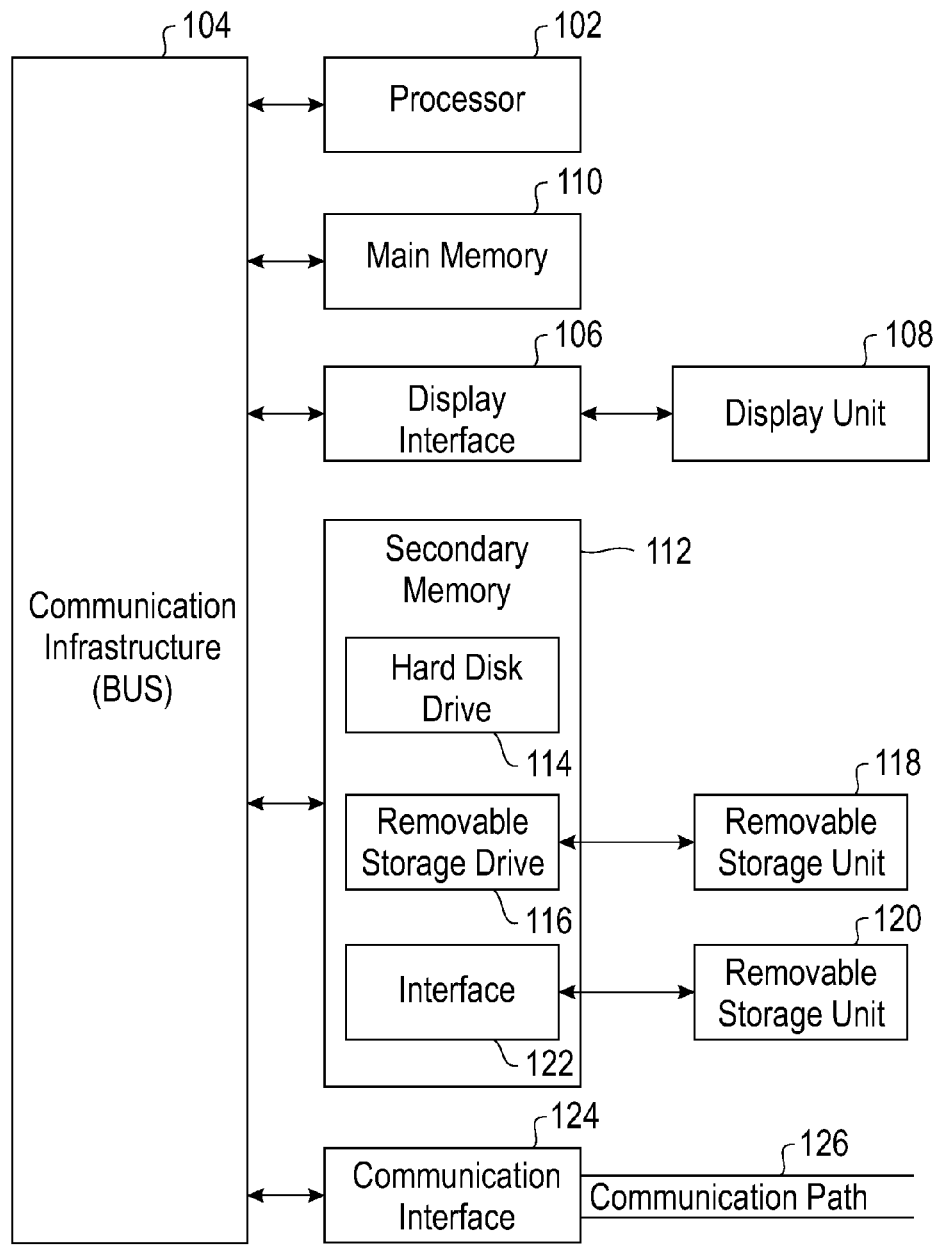
FIG. 2 shows a high level block diagram of an information processing system useful for implementing one embodiment of the present invention.

FIG. 2 is a high level block diagram showing an information processing system useful for implementing one embodiment of the present invention. The computer system includes one or more processors, such as processor 102. The processor 102 is connected to a communication infrastructure 104 (e.g., a communications bus, cross-over bar, or network). Various software embodiments are described in terms of this exemplary computer system. After reading this description, it will become apparent to a person of ordinary skill in the relevant art(s) how to implement the invention using other computer systems and/or computer architectures.

The computer system can include a display interface 106 that forwards graphics, text, and other data from the communication infrastructure 104 (or from a frame buffer not shown) for display on a display unit 108. The computer system also includes a main memory 110, preferably random access memory (RAM), and may also include a secondary memory 112. The secondary memory 112 may include, for example, a hard disk drive 114 and/or a removable storage drive 116, representing, for example, a floppy disk drive, a magnetic tape drive, or an optical disk drive. The removable storage drive 116 reads from and/or writes to a removable storage unit 118 in a manner well known to those having ordinary skill in the art. Removable storage unit 118 represents, for example, a floppy disk, a compact disc, a magnetic tape, or an optical disk, etc. which is read by and written to by removable storage drive 116. As will be appreciated, the removable storage unit 118 includes a computer readable medium having stored therein computer software and/or data.

In alternative embodiments, the secondary memory 112 may include other similar means for allowing computer programs or other instructions to be loaded into the computer system. Such means may include, for example, a removable storage unit 120 and an interface 122. Examples of such means may include a program package and package interface (such as that found in video game devices), a removable memory chip (such as an EPROM, or PROM) and associated socket, and other removable storage units 120 and interfaces 122 which allow software and data to be transferred from the removable storage unit 120 to the computer system.

The computer system may also include a communications interface 124. Communications interface 124 allows software and data to be transferred between the computer system and external devices. Examples of communications interface 124 may include a modem, a network interface (such as an Ethernet card), a communications port, or a PCMCIA slot and card, etc. Software and data transferred via communications interface 124 are in the form of signals which may be, for example, electronic, electromagnetic, optical, or other signals capable of being received by communications interface 124. These signals are provided to communications interface 124 via a communications path (i.e., channel) 126. This communications path 126 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 110 and secondary memory 112, removable storage drive 116, and a hard disk installed in hard disk drive 114.

Computer programs (also called computer control logic) are stored in main memory 110 and/or secondary memory 112. Computer programs may also be received via communications interface 124. Such computer programs, when run, enable the computer system to perform the features of the present invention as discussed herein. In particular, the computer programs, when run, enable the processor 102 to perform the features of the computer system. Accordingly, such computer programs represent controllers of the computer system.

From the above description, it can be seen that the present invention provides a system, computer program product, and method for implementing the embodiments of the invention. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
   performing a step that relies on the selection of x at a time t ($x_t$), where x is a time dependent variable involved with said step;
   calculating a resulting cost ($f_t(x_t)$) that results from selecting $x_t$ when performing said step, where $f_t$ is a cost function;
   finding a minimum possible cost associated with said selection of $x^*_t$, wherein $x^*_t$ is a variable that results in the minimum possible cost $f_t(x^*_t)$;
   determining the difference between the resulting cost ($f_t(x_t)$) and said minimum possible cost ($f_t(x^*_t)$);
   selecting a direction of movement from $x_t$ to $x_{t+1}$; and
   performing a subsequent step that relies on said section of $x_{t+1}$,
   wherein said selecting a direction of movement further comprises selecting a direction that is a function of a product of the inverse Hessian of B and the gradient of said cost $f_t$.

2. The method of claim 1 wherein said performing a step that relies on the selection of x at a time t ($x_t$) further comprises selecting $x_t$ from a barrier function B.

3. The method of claim 2 wherein said barrier function B defines a domain K in n-dimensional space.

4. The method of claim 3 wherein said selection a direction of movement further comprises solving a system of linear equations of order n, where n is the dimensionality of domain K from which x is selected.

5. The method of claim 1 further comprising performing a series of T stages, each stage comprising the performance of each of said above steps at different times using a different x.

6. The method of claim 5 wherein after T stages, said difference between the sum of the incurred costs ($f_1(x_1) + \ldots + f_T(x_T)$) and the minimum possible cost with some fixed decision $x^*_t (f_t(x^*_t) + \ldots + f_T(x^*_t)$ is the regret R, wherein R is proportional to $\sqrt{(T \log T)}$.

7. The method of claim 1 wherein said performing a step that results from the selection of x at a time t ($x_t$) is performed without advanced knowledge of said resulting cost ($f_t(x_t)$).

8. The method of claim 1 wherein x is a quantity of a product.

9. The method of claim 8 wherein said performing a step further comprises ordering a quantity x of said product.

10. A computer system having a processor for iteratively improving a chosen solution to an online convex optimization problem, said computer system executing procedures for:
    selecting x at a time t ($x_t$), where x is a quantity;
    calculating, by the processor, a resulting cost ($f_t(x_t)$) that results from selecting $x_t$ when performing said step, where $f_t$ is a cost function;
    finding a minimum possible cost ($f_t(x^*_t)$) associated with said selection of $x^*_t$;
    determining the difference between said resulting cost ($f_t(x_t)$) and said minimum possible cost ($f_t(x^*_t)$);
    selecting a direction of movement from $x_t$ to $x_{t+1}$,
    wherein said selecting a direction of movement further comprises selecting a direction that is a function of a product of the inverse Hessian of B and the gradient of said cost $f_t$.

11. The system of claim 10 wherein said selecting x at a time t ($x_t$) further comprises selecting $x_t$ from a barrier function B.

12. The system of claim 11 wherein said barrier function B defines a domain K in n-dimensional space.

13. The system of claim 12 wherein said selection a direction of movement further comprises solving a system of linear equations of order n, where n is the dimensionality of domain K from which x is selected.

14. A computer program product for online convex optimization, said computer program product comprising:
a non-transitory computer readable storage medium having computer readable program code embodied therewith, said computer readable program code comprising:
computer readable program code configured to:
performing a step that relies on the selection of x at a time t ($x_t$), where x is a variable involved with said step;
calculating a resulting cost ($f_t(x_t)$) that results from selecting $x_t$ when performing said step, where $f_t$ is a cost function;
finding a minimum possible cost ($f_t(x^*_t)$) associated with said selection of $x^*_t$;
determining the difference between said resulting cost ($f_t(x_t)$) and said minimum possible cost ($f_t(x^*_t)$);
selecting a direction of movement from $x_t$ to $x_{t+1}$; and
performing a subsequent step that relies on the section of $x_{t+1}$,
wherein said selecting a direction of movement further comprises selecting a direction that is a function of a product of the inverse Hessian of B and the gradient of said cost $f_t$.

15. The computer program product of claim 14 further comprising performing a series of T stages, each stage comprising the performance of each of said above steps at different times using a different x.

16. The computer program product of claim 15 wherein after T stages, said difference between the sum of the incurred costs ($f_1(x_1)+ \ldots +f_T(x_T)$) and the minimum possible cost with some fixed decision $x^*_t (f_t(x^*_t)+ \ldots +f_T(x^*_t)$ is the regret R, wherein R is proportional to $\sqrt{\text{right arrow over }(T \log T)}$.

17. The computer program product of claim 14 wherein said performing a step that results from the selection of x at a time t ($x_t$) is performed without advanced knowledge of said resulting cost ($f_t(x_t)$).

18. The computer program product of claim 14 wherein x is a quantity of a product.

* * * * *